Figure 1:
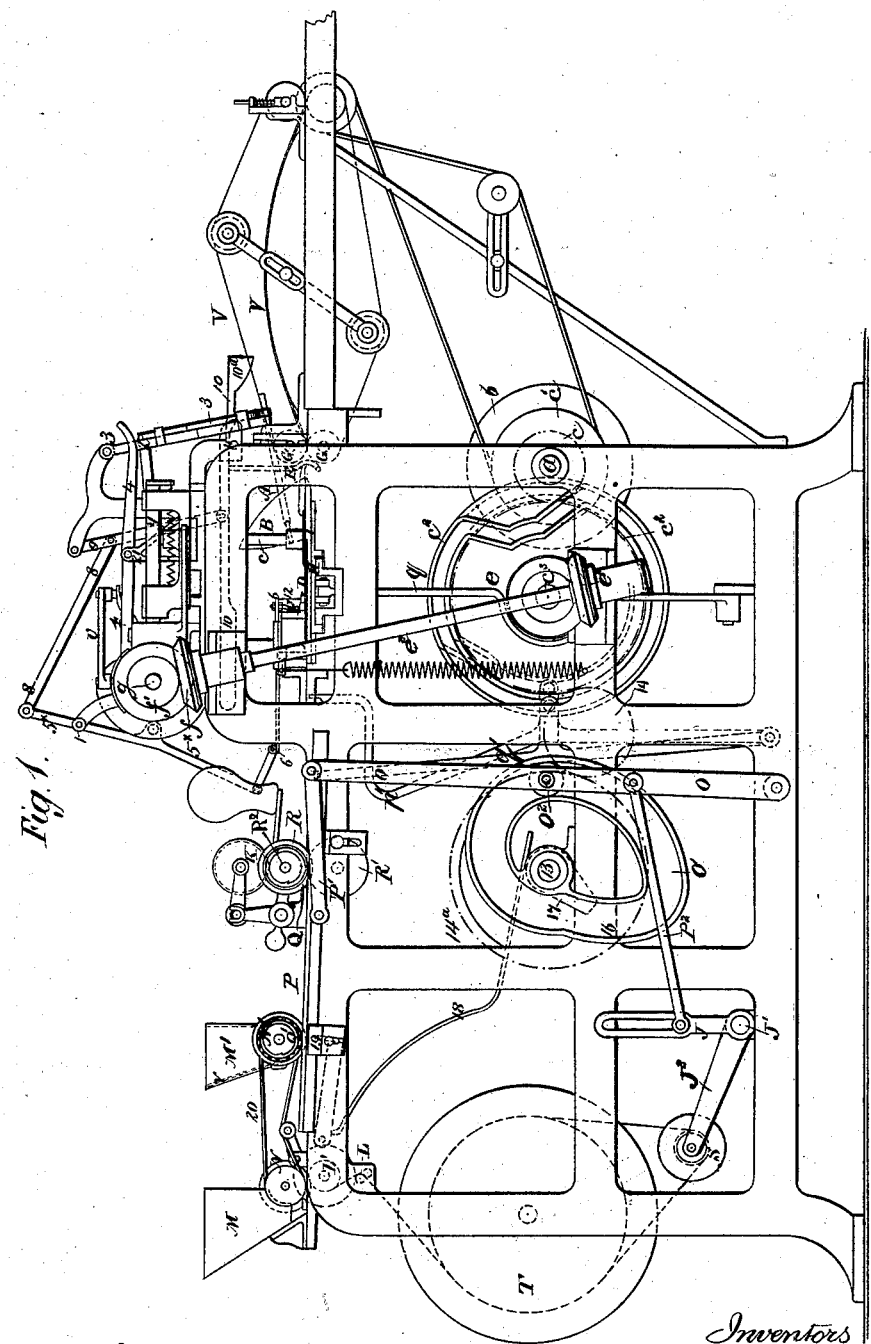

(No Model.) 16 Sheets—Sheet 1.

T. COATES & J. J. BISSICKS.
PAPER BAG MACHINE.

No. 282,166. Patented July 31, 1883.

Witnesses
Chas H Smith
J. Haily

Inventors
Thomas Coates
Jos. J. Bissicks
per Lemuel W. Serrell atty (No Model.) 16 Sheets—Sheet 3.

T. COATES & J. J. BISSICKS.
PAPER BAG MACHINE.

No. 282,166. Patented July 31, 1883.

Witnesses
Chas. H. Smith
J. Hail

Inventors
Thomas Coates
Jos. J. Bissicks
per Lemuel W. Serrell
atty (No Model.) 16 Sheets—Sheet 4.
T. COATES & J. J. BISSICKS.
PAPER BAG MACHINE.
No. 282,166. Patented July 31, 1883.
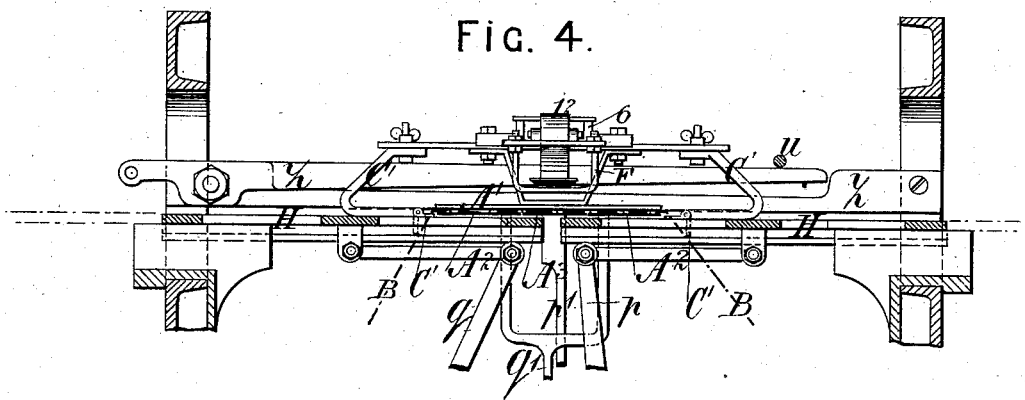
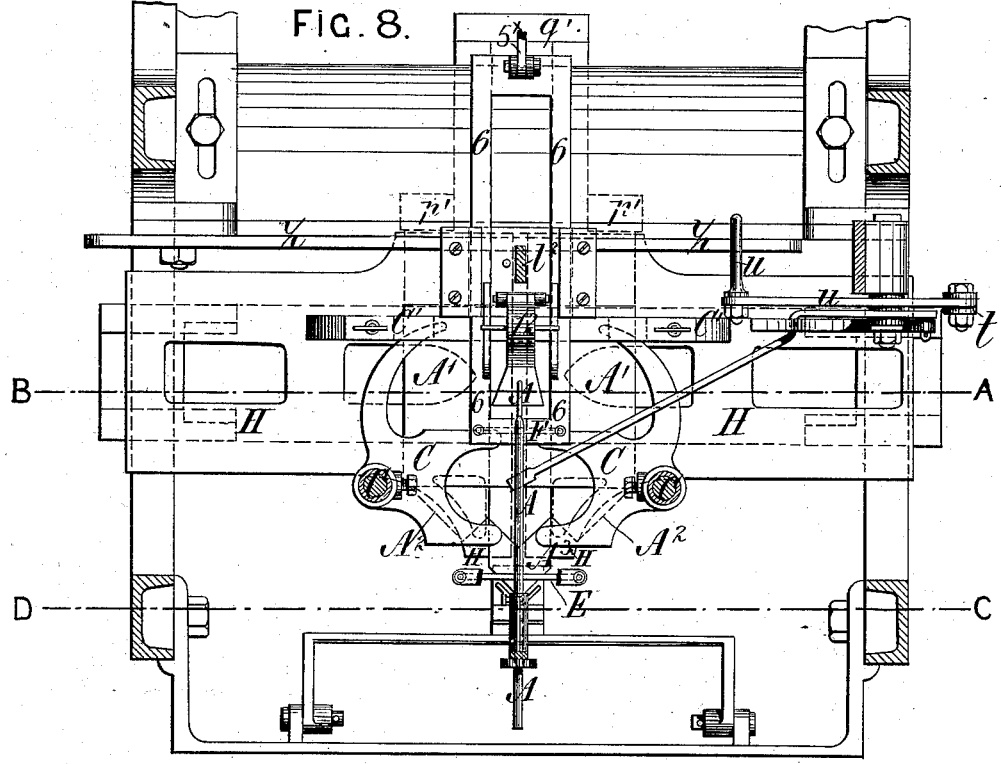

(No Model.) 16 Sheets—Sheet 5.

T. COATES & J. J. BISSICKS.
PAPER BAG MACHINE.

No. 282,166. Patented July 31, 1883.

Witnesses
Chas. H. Smith
J. Staib

Inventors
Thomas Coates
Jos. J. Bissicks
per Lemuel W. Serrell
atty.

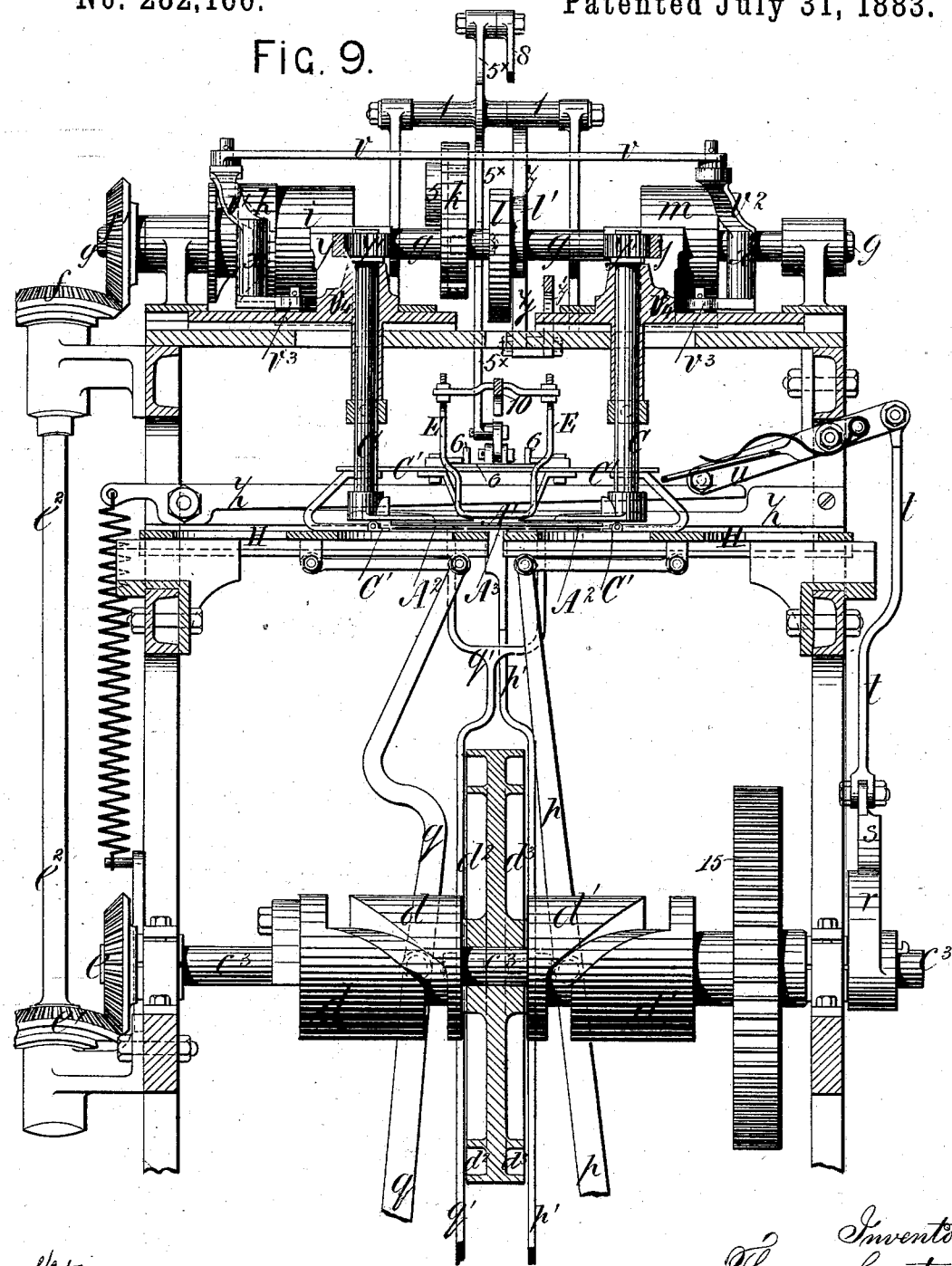

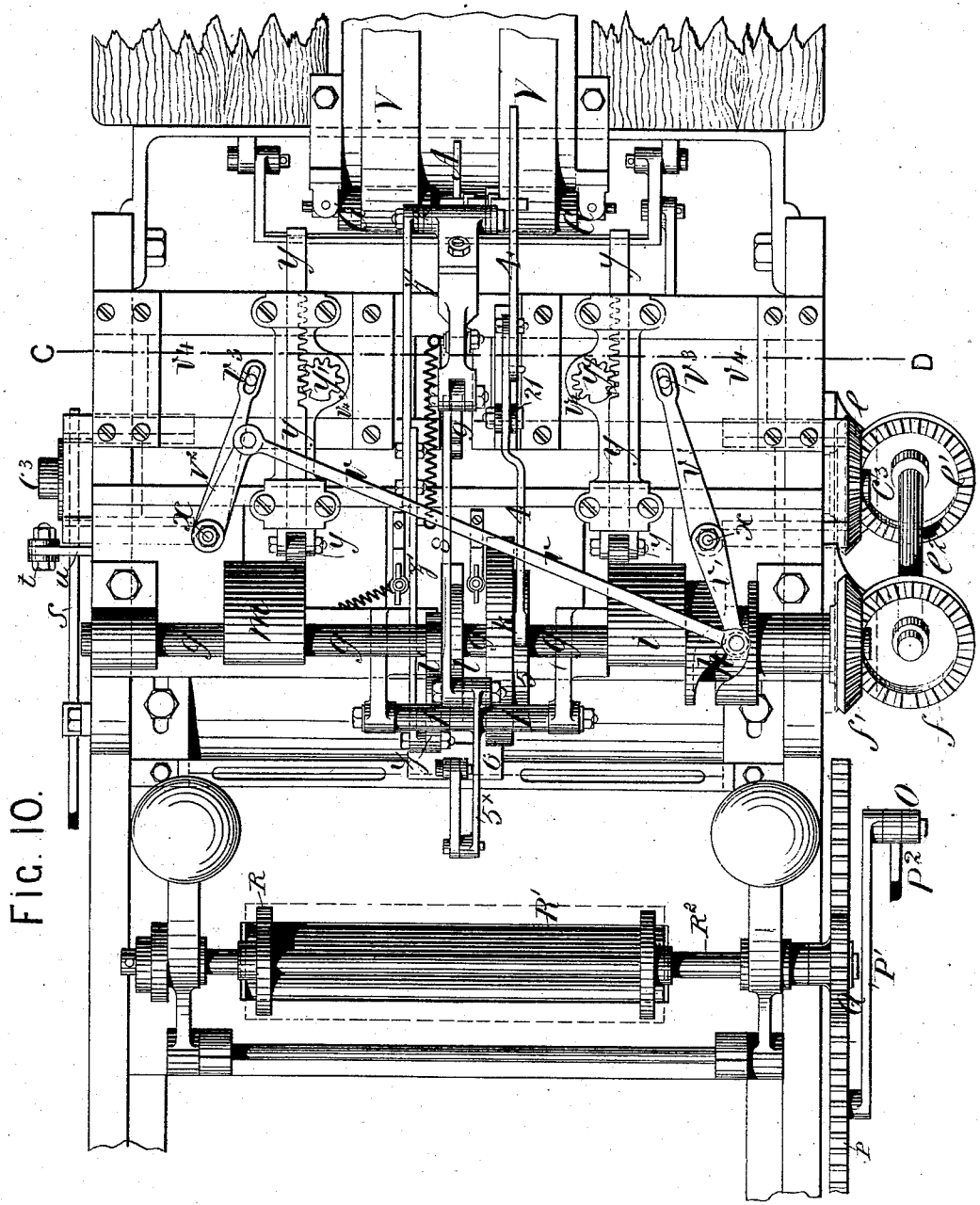

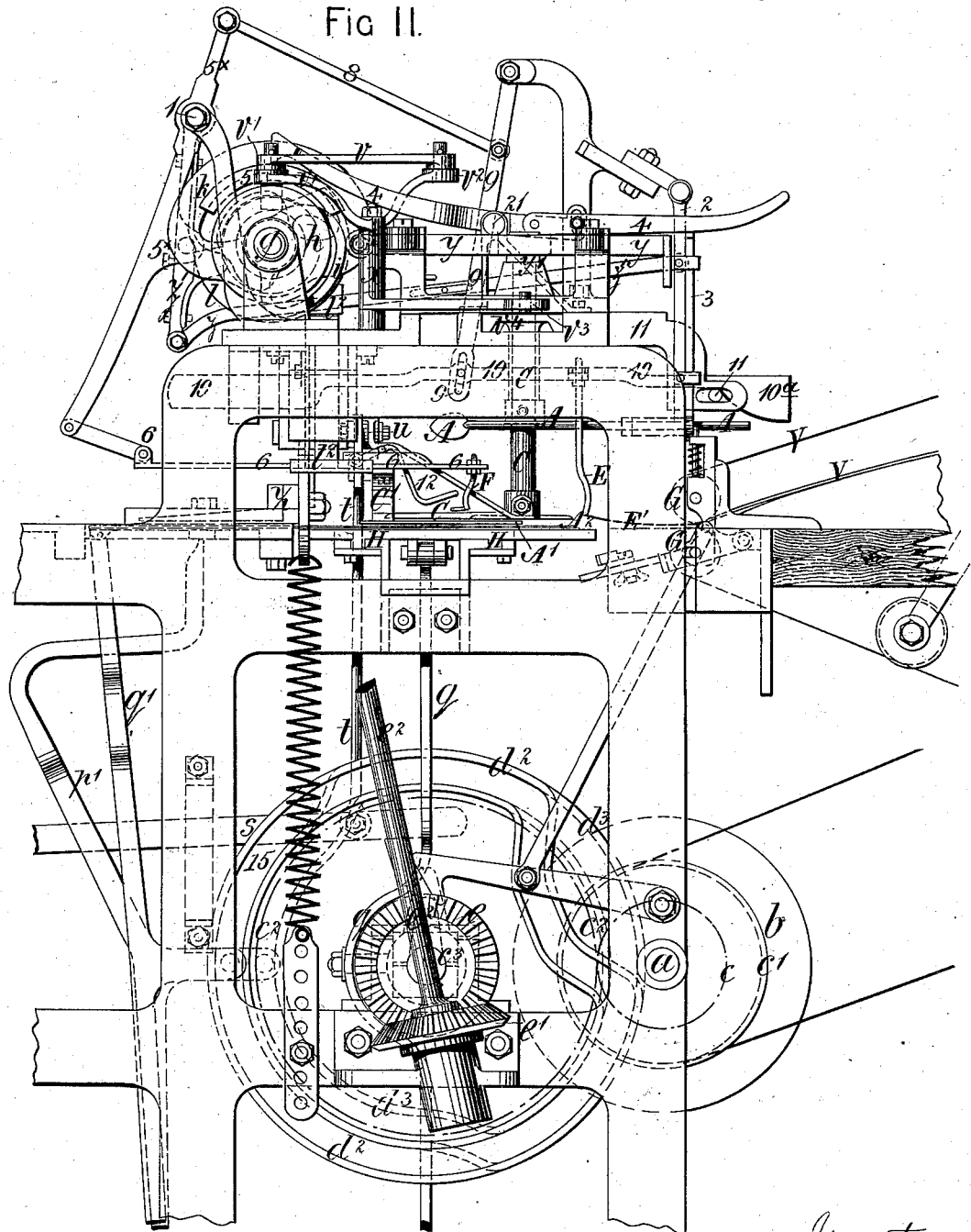

(No Model.) 16 Sheets—Sheet 9.
T. COATES & J. J. BISSICKS.
PAPER BAG MACHINE.

No. 282,166. Patented July 31, 1883.

Witnesses
Harold Serrell
Chas H Smith

Inventors
Thomas Coates
Joseph James Bissicks
per Lemuel W. Serrell
atty.

(No Model.) 16 Sheets—Sheet 10.

T. COATES & J. J. BISSICKS.
PAPER BAG MACHINE.

No. 282,166. Patented July 31, 1883.

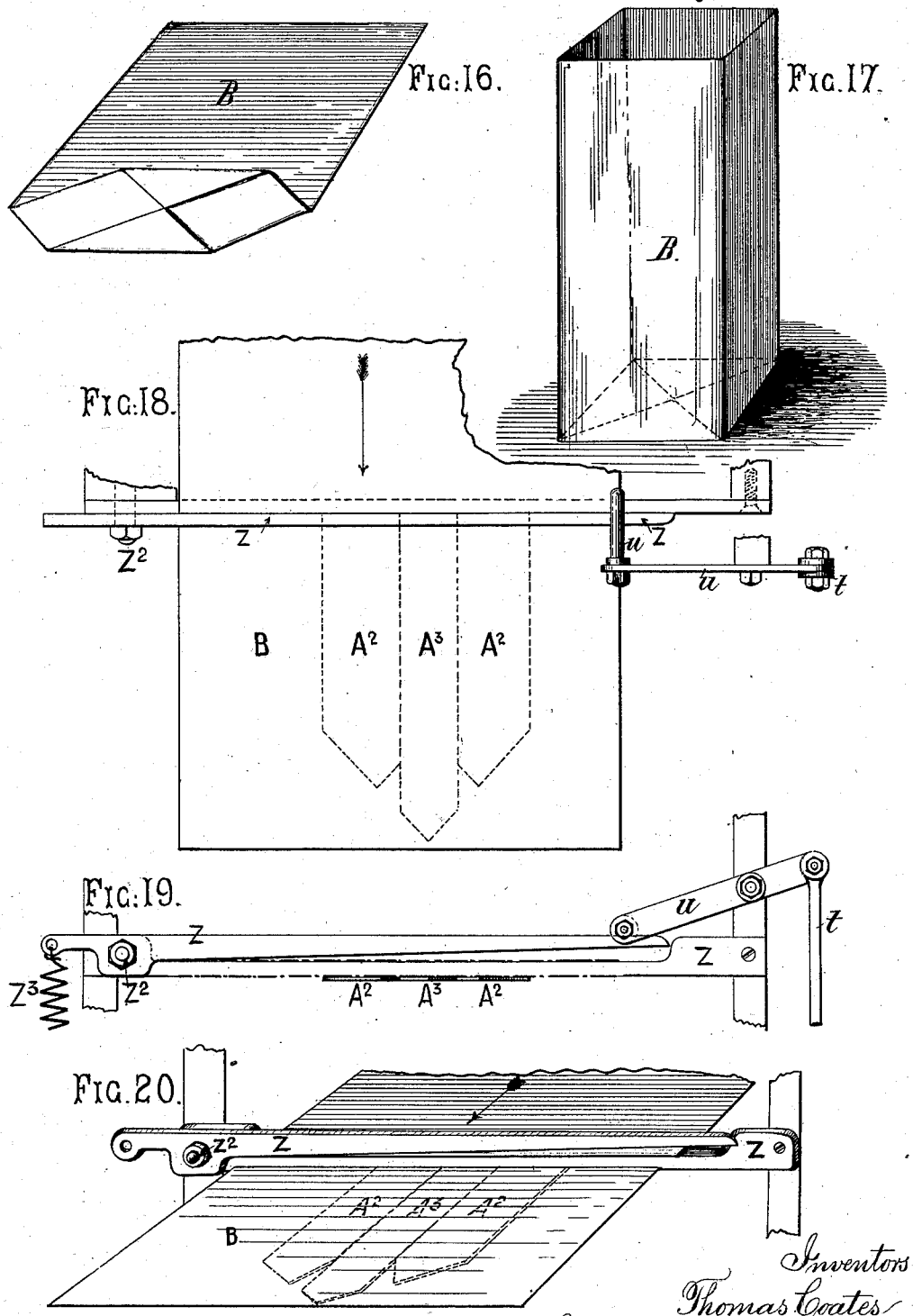

(No Model.) 16 Sheets—Sheet 12.
T. COATES & J. J. BISSICKS.
PAPER BAG MACHINE.
No. 282,166. Patented July 31, 1883.
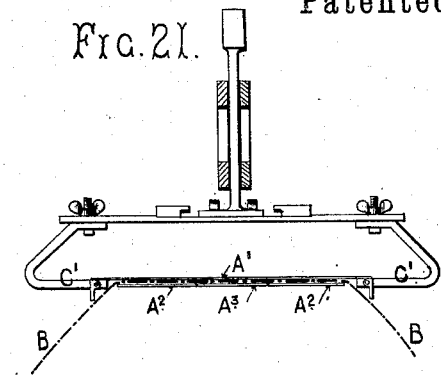
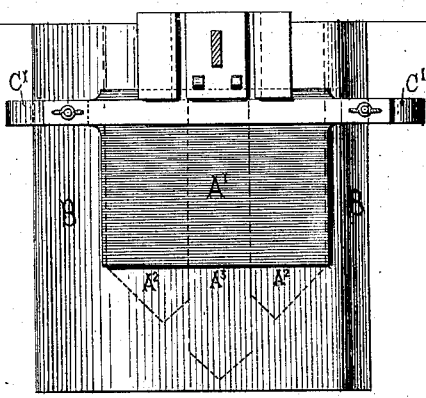
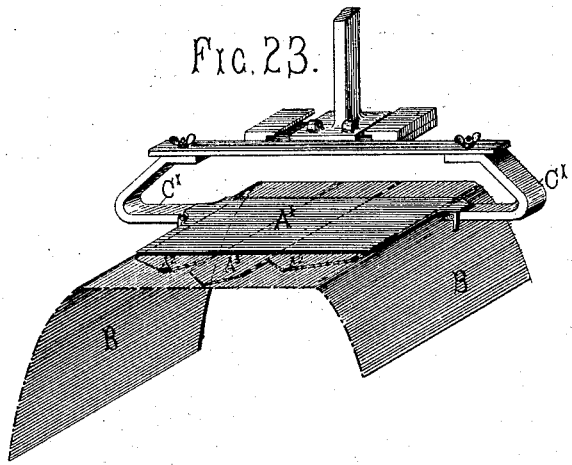

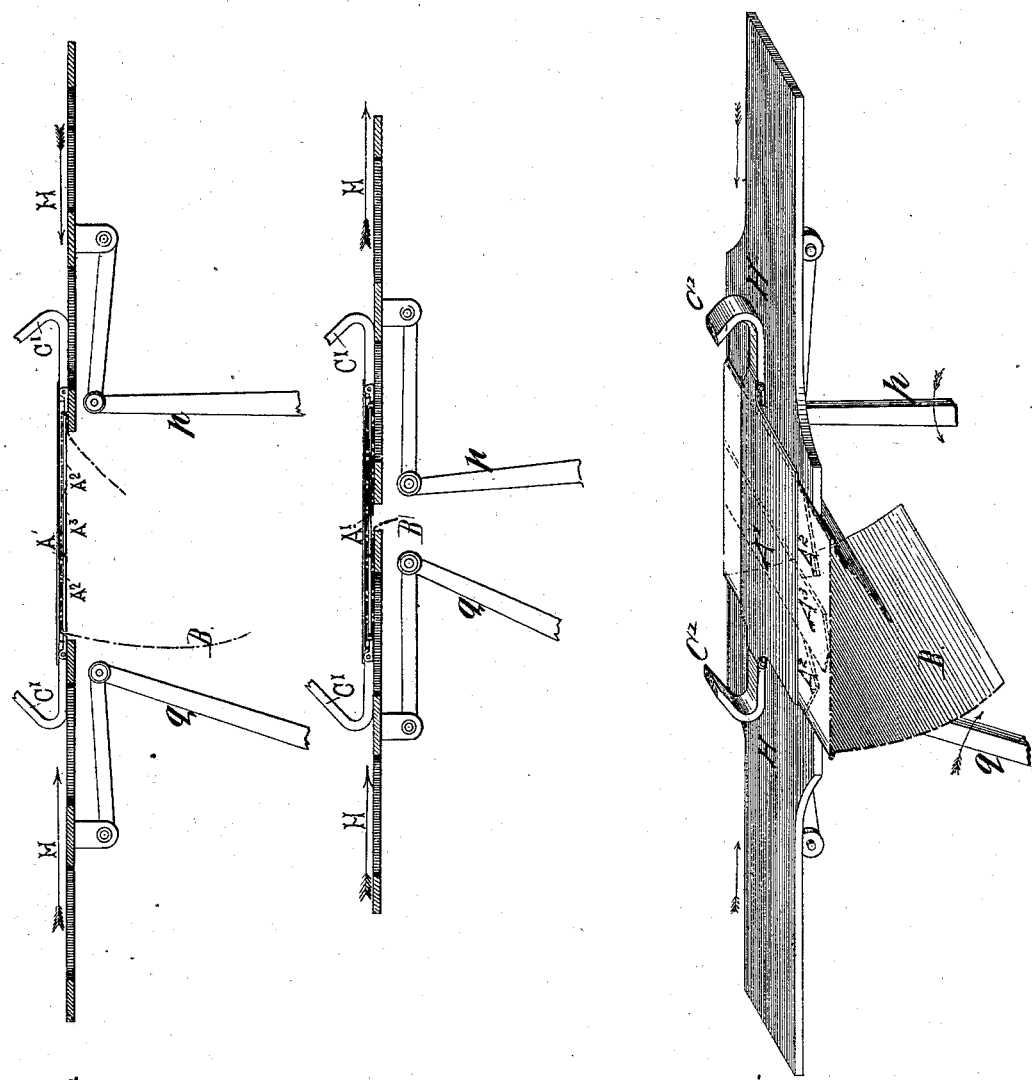

(No Model.)   16 Sheets—Sheet 14.
T. COATES & J. J. BISSICKS.
PAPER BAG MACHINE.
No. 282,166.   Patented July 31, 1883.
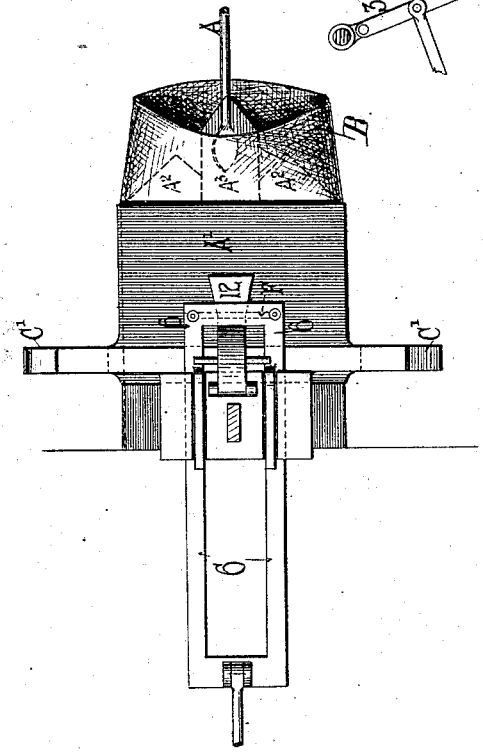
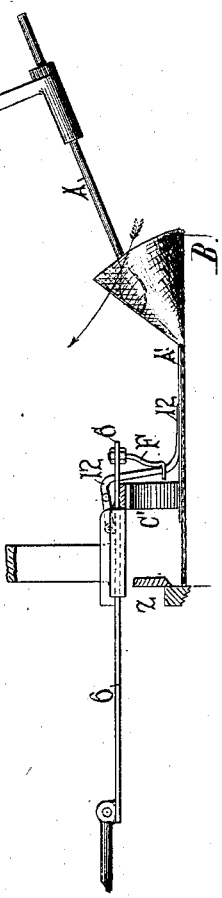
Witnesses
Harold Serrell
Chas H Smith
Inventors
Thomas Coates
Joseph James Bissicks
per Lemuel W. Serrell
Atty (No Model.) 16 Sheets—Sheet 15.

T. COATES & J. J. BISSICKS.
PAPER BAG MACHINE.

No. 282,166. Patented July 31, 1883.

Witnesses
Harold Serrell
Chs H Smith

Inventors
Thomas Coates
Joseph James Bissicks
per Lemuel W. Serrell
Atty (No Model.) 16 Sheets—Sheet 16.

T. COATES & J. J. BISSICKS.
PAPER BAG MACHINE.

No. 282,166. Patented July 31, 1883.

Witnesses
Harold Serrell
Chas H Smith

Inventors
Thomas Coates
Joseph James Bissicks
per Lemuel W. Serrell
Atty.

N. PETERS, Photo-Lithographer, Washington, D. C.

UNITED STATES PATENT OFFICE.

THOMAS COATES AND JOSEPH J. BISSICKS, OF BRISTOL, COUNTY OF BRISTOL, ENGLAND.

PAPER-BAG MACHINE.

SPECIFICATION forming part of Letters Patent No. 282,166, dated July 31, 1883.

Application filed December 10, 1880. (No model.) Patented in England February 25, 1879, No. 759; in France August 22, 1879, No. 120,793; in Belgium August 25, 1879, No. 49,142, and in Germany November 29, 1879, No. 10,742.

*To all whom it may concern:*

Be it known that we, THOMAS COATES and JOSEPH JAMES BISSICKS, both of the city and county of Bristol, England, have invented new and useful improvements in machinery for making and printing on paper bags having square bottoms when opened out, (for which we have obtained a patent in Great Britain, dated the 25th of February, 1879, No. 759,) of which the following is a specification.

The object of this invention is to produce and print by one machine paper bags having square bottoms.

Figure 2:
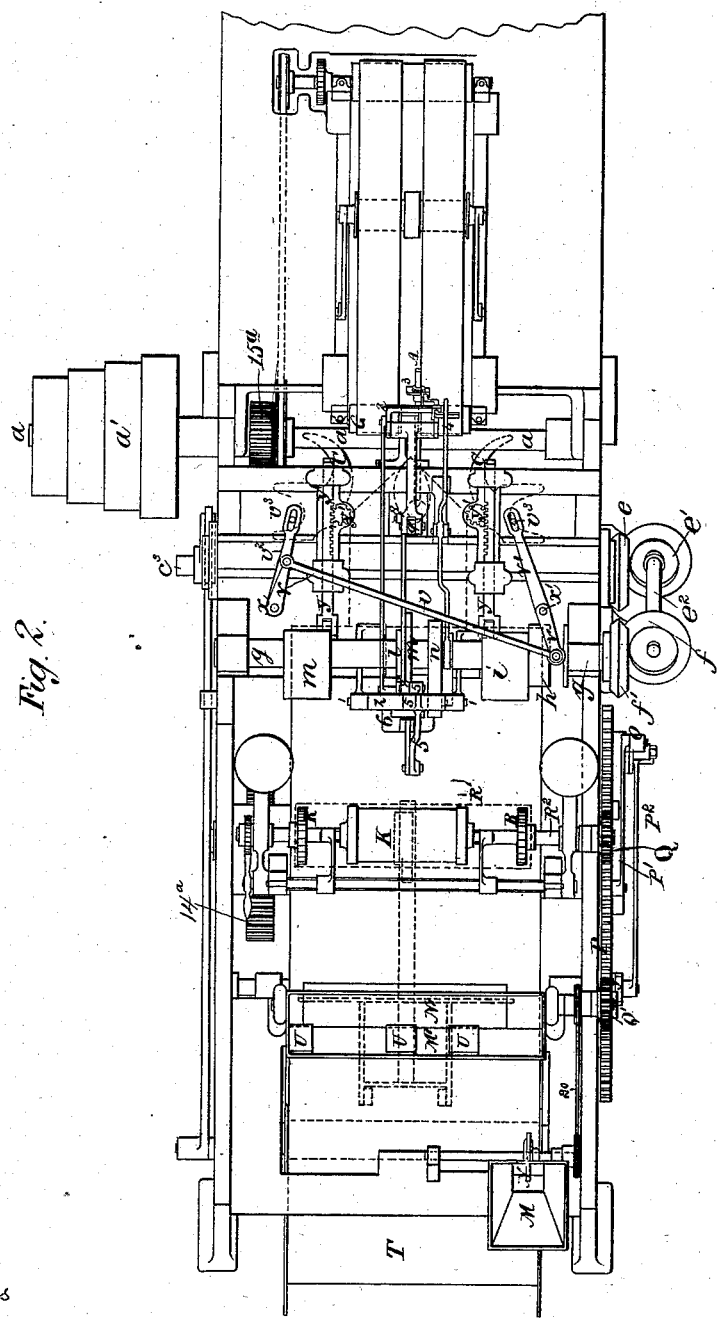
Figure 3:
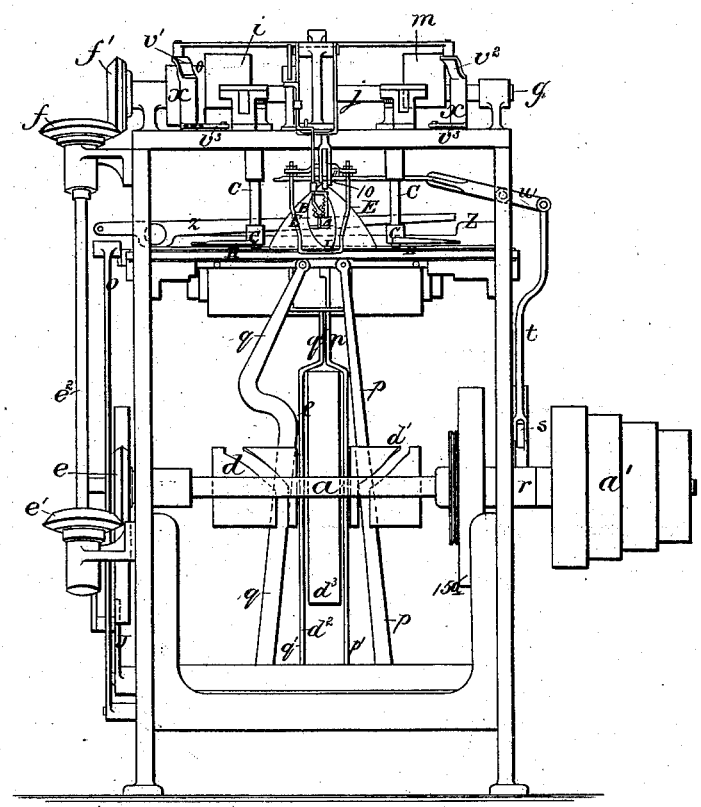
Figure 5:
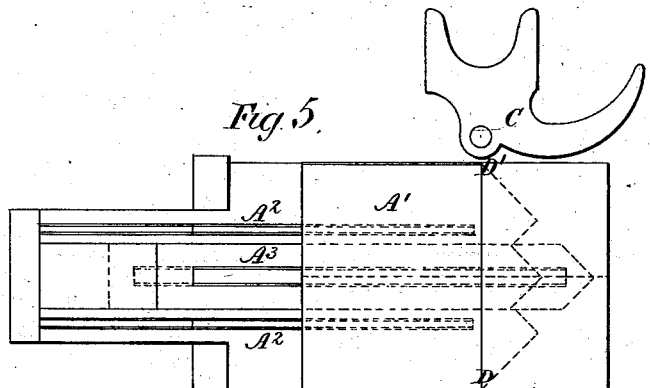
Figure 6:
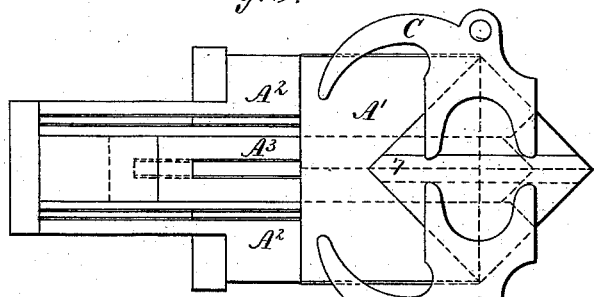
Figure 7:
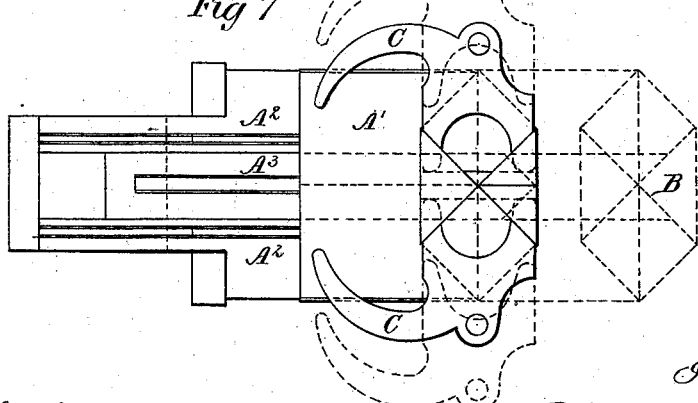
Figure 12:
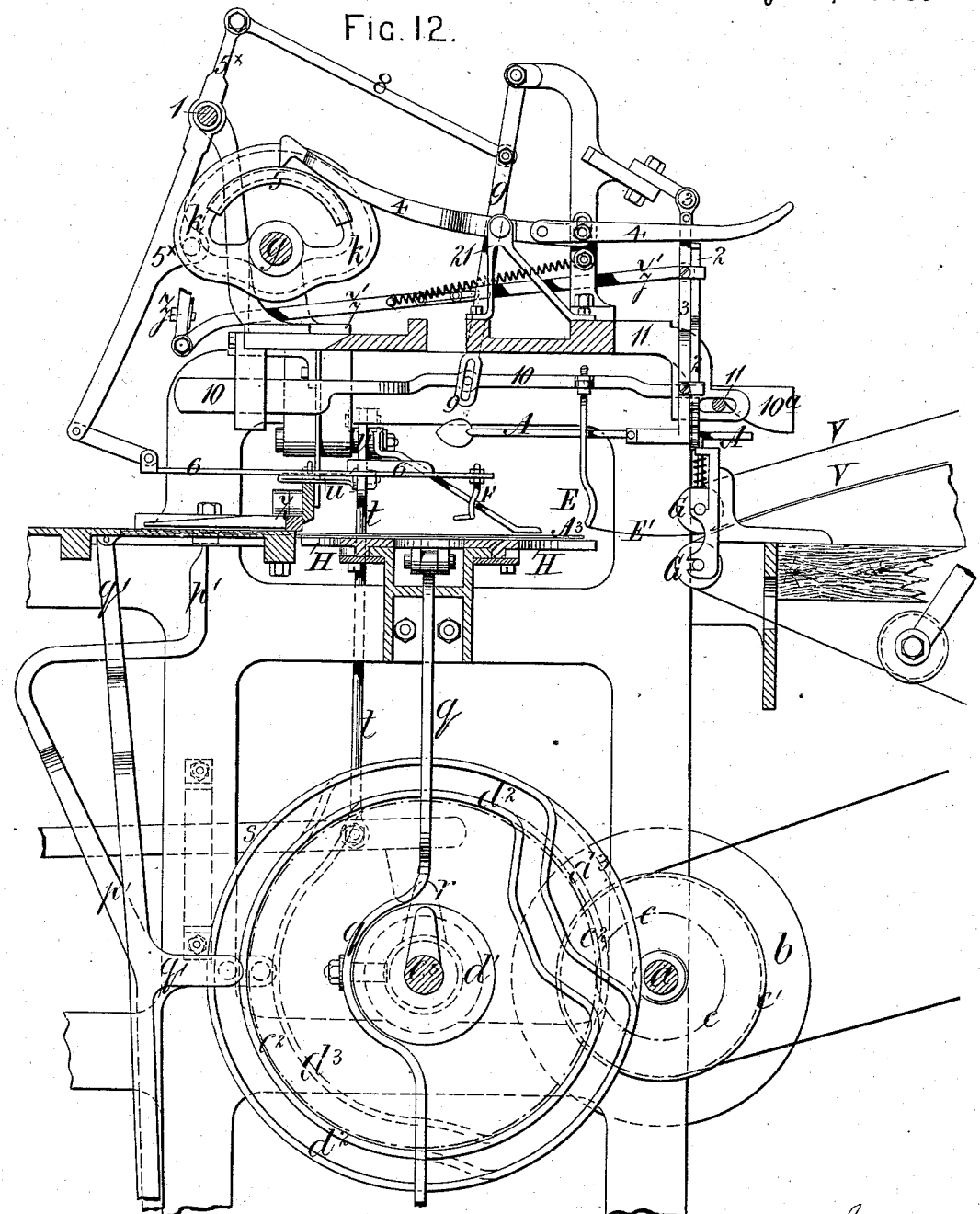
Figure 13:
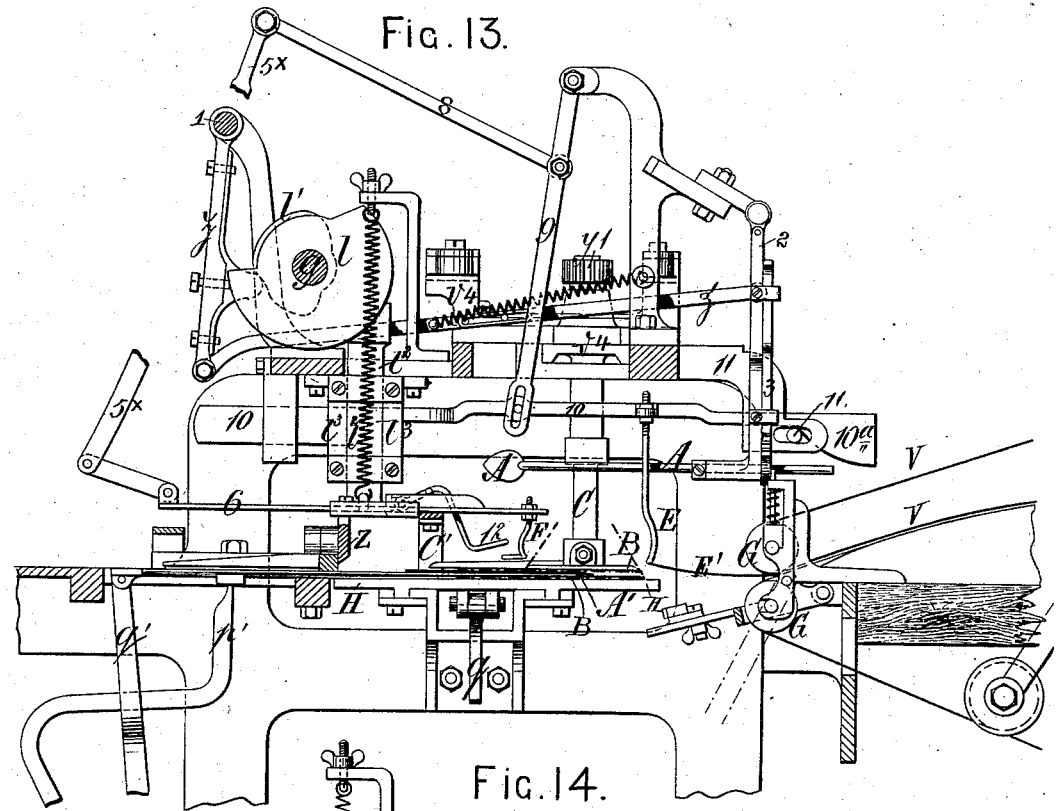
Figure 14:
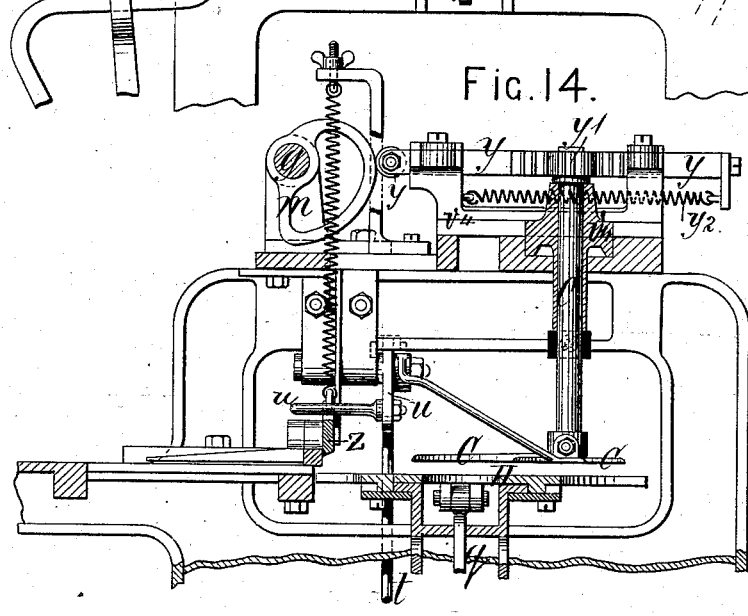

Figure 1 is a side elevation, and Fig. 2 is a plan, of such a machine. Fig. 3 is an end view of same with heating apparatus omitted in order to show the more important parts. Figs. 5, 6, and 7 are details of the gage-plate drawn to a larger scale. Fig. 4 is a cross-section through line A B of Fig. 8; Fig. 9, a cross-section through the line C D of Figs. 8 and 10; Fig. 8, a sectional part plan; Fig. 10, a part plan; Fig. 11, a part side elevation of the machine, the ink-roller being omitted. Figs. 12, 13, and 14 are part sectional elevations to show the different cam-motions of the machine, and Fig. 15 the detail of the finger mechanism, which will be hereinafter referred to; and Figs. 15 to 33, inclusive, are detail views of the paper and the means for operating upon it in the different stages of folding the bag.

The process is first commenced by placing a continuous roll of paper, T, of the required width, on a spindle at one end of the machine. The paper is drawn off intermittently and at suitable lengths by mechanical arrangements, which we will now describe.

O is a lever caused to oscillate by a rotating cam, O'. The lever O has a small runner or roller, $O^2$, at about the center. This runner is always in the groove of the cam O'. A sliding rack, P, is attached to the lever O by connecting-rod P' at its uppermost part. This rack P thus moves with the lever O and acts upon the drawing-up roller or rollers R by a ratchet and spur-wheel, Q, causing them to revolve once every revolution of the cam, and thereby moving the paper which is between the rollers R and a loose roller, R', under the paper, the upper rollers being held down by weights, which give the necessary bite to draw up the paper, the circumference of rollers R being equal to the length of paper required.

The connecting-rod $P^2$ at the lower part of lever O is connected to a lever, J, mounted on a shaft, J', having arms $J^2$ from it, as shown, which carry a spindle and roller, S, around which the paper passes, and by the oscillations of the lever O the exact quantity of paper required is thus intermittently drawn from the continuous roll T. The connecting-rod $P^2$ is adjustable in a slot in the lever J. It will therefore be seen that as the rack P draws up the paper the roller S forms the required slack or loop and leaves the paper free to be drawn down without turning the roll T; but as the lever J is moved the roller S falls and draws down sufficient paper for the next bag. The paper in its course runs as shown in dotted lines, and enters between the small rollers L, in order to take the curl out of the paper when necessary. Then the paper passes over another guide-roller, L', and then flat upon the table of the machine, above which are pasting and printing appliances, which operate upon the top surface of the paper before and while it is carried on by drawing-rollers and cut off. The paste-boxes M M' have rollers N N', which revolve at the same time as the drawing-rollers, and are driven by lever O from rack, pinion, and ratchet Q'. The rollers N N', being fitted sufficiently tight in the boxes M M', allow paste to collect upon them at parts only where required, and the paper is brought into contact with these pasting-rollers intermittently for pasting the bottom and continuously for the side seam, as required, the roller N being employed to paste the side-seam and the roller N' to paste the bottom seam. The plates U are fixed at certain points in order to take off the paste on the roller N' at the parts where no paste is required on the paper, thus leaving the other parts of the paper pasted after it is lifted against the roll by a thin bar under the paper and lengthwise with the roller.

The paper having been drawn forward the required length, it is cut off by a pair of knives, Z, (see Figs. 3, 4, and 9, and detail views,) at the end of the gage-plate A'. This leaves a sheet of paper placed upon the mold-plate upon which the bag is formed. The mold-plate and parts connected therewith are shown more distinctly in the enlarged detail views, Figs. 4 to 9, Fig. 4 being a vertical cross-section at the line A B of Fig. 8, and Figs. 5, 6, and 7 being three plans of same; Fig. 8, a sectional plan, and Fig. 9 a sectional end elevation. The mold-plate has two moving parts. The center part, $A^3$, is drawn back to allow the front corner of the bag to be turned over the two square parts of the creasers C. The other moving part is mentioned hereinafter. As the cut takes place a gage-plate, A', and strikers C' come down upon the sheet of paper, as shown in Figs. 4, 8, and 9. The strikers C' serve to press down the two overlapping sides of the paper now upon the mold-plate, which sides form the seam side of the bag. The gage-plate A' serves as a line or plate, over which the paper is folded on line D D', Fig. 5, over which gage-plate A' the creasers C partly revolve and flatten down the paper to make the first or diamond fold of the bag-bottom. The sides of paper being depressed, two side slides, H, Figs. 4 and 8 to 14, are thrust in on each side, folding first one side under the mold-plate and then the other side, so that an overlap takes place of suitable width to allow the two surfaces to remain pasted together.

The mold-plate being in position shown in Fig. 5, the paper tube, which has now been formed, is opened by a finger, A, (see Figs. 1, 3, and 8,) which opens the mouth of the paper tube to allow the creasers to operate. (The finger A is made in various shapes where it acts upon the paper, as most suitable to the thickness and quality thereof.) Two revolving creasers or folders, C, act upon the paper now held up by the finger A, first by flattening down one side and then the other, as shown at Fig. 6. The parallel edges of the creasers or folders C, when together, serve as gages or templets, over which the corners are folded by two moving parts, E and F, (see Figs. 4, 8, 9, 11, 12, and 13,) so arranged as to lift the corners and lay them over and upon the top surface of the square or parallel part of the creasers C, and close the bottom of the bag. The bit E and the back corner slide F, for effecting this operation, act simultaneously, as shown by dotted lines, Fig. 13, and effectually fold the two corners over the creasers C. These folds having been effected, the creasers C are withdrawn from under the folded paper into the position shown in dotted lines in Fig. 7. This leaves the bag, which has now been formed, to be thrust off by the second moving part, $A^2$, of the mold-plate, which part $A^2$ is thrust forward and carries the finished bag into the bite of endless bands V and rollers G, Figs. 11 and 12, which revolve and take the finished bag to the required place. The operations then repeat themselves automatically.

The various working parts above described obtain their motion by the following means; but any other suitable means may be used for producing the said motions:

On the first motion-shaft, $a$, of the machine a cone-pulley, $b$, is fixed, corresponding with a cone-pulley on the driving-shaft, to regulate the speed of the machine at will. The shaft $a$ has upon it the spur-pinion $c$ and the gut-wheel $c'$, which latter drives the taking-off rollers G G'. The pinion $c$ gears with a spur-wheel, $c^2$, on the main shaft $c^3$. On the main shaft $c^3$ there are cams $d\ d'\ d^2\ d^3$, (see Figs. 9, 11, and 12,) and a bevel-wheel, $e$, at the end gearing into bevel-wheel $e'$ on a slanting shaft, $e^2$. This shaft, by means of bevel-wheels $f$ and $f'$ at its top, drives the top shaft, $g$. This shaft has cams $h, i, k, l,$ and $m$. (See Figs. 9 and 10.

The side slides, H, (see Figs. 3, 9, and 11,) are moved to and from the mold-plate by the slotted cams $d$ and $d'$ and levers $q$ and $p$ (see Fig. 9) having small runners and pins. These levers are centered on pins at the bottom. (See Fig. 1.) The cams $d^2$ and $d^3$ (see Figs. 9 and 11) have each a groove in the outer side, into which the runners and pins fixed to levers $p'$ and $q'$ continually run; and the grooves are nearer to the center of the cams at some parts than at others, thus as the cams turn giving the required motion to the levers which act upon the two moving parts of the mold-plate.

The small knife-cam $r$, Figs. 9 and 12, as it revolves, lifts the lever $s$, which, by connecting-rod $t$ and oscillating lever $u$, having a projecting pin at the end opposite to the connecting-rod, presses down the knife-blade Z and cuts the paper.

The withdraw-cam $h$ on shaft $g$ has an irregular continuous groove around its face, into which the runner on levers $v\ v'$ works, the lever $v$ being connected by a short arm to the lever $v^2$ upon its center, $x$, and the levers $v'\ v^2$, being centered at $x\ x'$, and having at their ends slots and pins $v^3$, act upon the two sliding castings $v^4$, which carry the spindles to which the creasers C are fixed, as seen in Figs. 9, 10, and 11, and these working parts give the required motion to the creasers C C to withdraw them from the bag when the last two corners are turned, thus leaving the bag free to be thrust off, as hereinafter described.

The irregular cams $i$ and $m$ act upon the two sliding racks $y\ y$, Fig. 10, which gear into a pinion, $y'$, on top of creaser-spindles. Thus as the cams $i\ m$ revolve they thrust in the racks $y\ y$, which turn the creaser-spindles. There are springs $y^2$, Fig. 14, which bring them back, so as to follow the shape of the cams $i\ m$, and thus the creaser-spindles and creasers return after having folded the parts of bag required.

The gage-plate cam $l$, Fig. 13, acts upon the vertical sliding bar $l^2$, Figs. 8 and 13, in box $l^3$, at the end of which the striker C' and gage-plate A' are fixed. This cam thrusts down the gage-plate when the paper is in position, and during the folding the cam keeps it down by being circular in one part and having a gap in another portion, to allow the gage-plate to rise and allow the paper to run under the same.

Figure 15:
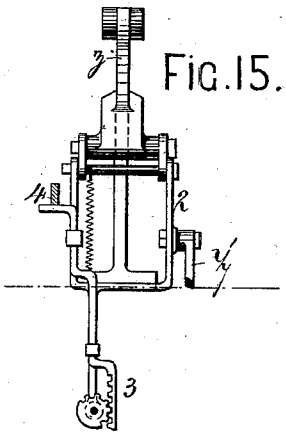

The finger-cam $l'$ on spindle $g$ (shown in dotted lines in Fig. 13) acts upon lever $z$ at the back of the head-table, swinging on pin 1, and at the lower end a connecting-rod, $z'$, is attached to connect the lever $z$ to the finger-forging 2, Figs. 12, 13, and 15. This forging has the finger-bar running through the boss at right angles with the forging 2. This bar has a pinion fixed at one end, into which meshes a rack, 3, sliding vertically in finger-forging 2, which rack 3, being thrust down, turns the finger-bar to right angles. This rack 3 is thrust down by a lever, 4, supported on bracket and pin 21, (see Fig. 12,) and caused to move by cam 5 on the side of the bit-cam $k$. The latter is grooved in suitable shape, and has a runner working in it on pin fixed in lever $5^\times$, which swings on pin 1. The lower end of this lever $5^\times$ is connected to a slide, 6, working backward and forward. This slide 6 carries the "bit" F at its front end, which, when thrust in by lever $5^\times$, turns the rear corner of the bag B, Fig. 13, and holds it down until the bag is thrust under the front bit, E, Figs. 3 and 9. Then it returns to its first position. The lever $5^\times$ also has connecting-rod 8, which is jointed to lever 9. The latter, at its lower end, acts by slot and pin upon a sliding bar, 10, which carries the front bit, E; and from the connections it will be seen that at the time the back corner slide, 6, is brought forward the front bit, E, advances to meet it, and turns over the front corner of the bag on its way. The sliding bar 10 is at the outer end, $10^a$, formed so as to rise in its movement on the pin 11 in bracket. This pin is adjustable in a slot to suit large and small bags. The rising of this bar 10, with front bit attached, lifts the front corner, after which, by its continued motion, it lays the corner down, as shown in Fig. 7.

The front bit, E, has a thin flat piece of metal, E', attached to it, which prevents the corner of the bag from rising when it is thrust off into bite of the endless band V, which passes round the rollers G.

The back corner lifter, 12, Figs. 4, 8, and 11, is a hinged arm, which is lifted by the back bit, F, and thus prepares the back corner of the bag so that the bit will turn it over and the squares of the creasers will complete the fold. The lifter 12 is, by a cross-piece fixed thereto, kept up until the slide 6 returns. These are the moving parts connected with forming and folding the bag.

The following is a description of the means of drawing up and printing and pasting the paper:

The shaft 13, Fig. 1, revolves at the same speed as the main shaft $c^3$, and is worked therefrom by a spur-wheel, $15^a$, upon the main driving-shaft $a$, gearing with the spur-wheel 15 upon shaft $c^3$, and intermediate spur-wheel, 14, gearing into a spur-wheel, $14^a$. At one end of this shaft 13 a drawing-up cam, O', is fixed on the end of the shaft 13, and in the groove of this cam works a runner $O^2$, on the lever O, which carries the rack P with it. This rack drives two spur-wheels, Q Q', backward and forward, and by means of ratchet and catch in each wheel the spindles of the pasters and the drawing-gear are turned in one direction only and exactly one complete turn, as described above. In Fig. 1 the paste-cam 17 (shown in dotted lines) is fixed to shaft 13. This cam lifts (at each turn of shaft) the lever 18, and to this lever the paste-bar 19 is attached, and when lifted it raises the paper which is over it against the paste-roller N', which gives the required spots of paste. The roller of side-seam paste-box is driven by belt 20 from large paste-box spindle. The printing-rollers are placed on spindle and fixed in place required by set-screws.

The process of printing is effected by having upon the spindle $R^2$ carrying-rollers R. This spindle revolves once for every bag. All that is now required is to fix an electrotype upon the rollers R by lapping and securing the same around said rollers R, which being done brings the face of the uniformly-thick electrotype in position to meet the paper to be printed upon. As the electrotype revolves the inking is done by the roller K, which has cloth or other suitable material upon it, which holds the ink. The ink-roller K is driven by friction from the printing-roller.

The succcessive operations of manufacturing bags of our form are illustrated by a series of diagram views, Figs. 16 to 33, inclusive, Fig. 16 being a view of the bag as delivered from the machine in a closed or flattened form, and Fig. 17 showing it opened out as when in use.

The machine before described, after printing and pasting, cuts off a piece of paper of a suitable size to form a bag, which receives a series of folds in the manner illustrated in the diagram views, the several parts of the mechanism used in the operation of folding the bag being marked with the same letters of reference as before used in describing the machine and its motions.

The web of paper is carried on a reel or bobbin, from which it is intermittently delivered, printed, pasted, and carried forward to the folding mechanism, as previously described.

Diagrams 18, 19, and 20 illustrate the cutting operation, Fig. 18 being a plan, and Fig. 19 a front elevation, of the mechanism by which a piece of paper is cut off or separated from the length, and Fig. 20 is a perspective view of the apparatus.

The paper is moved forward, in the direction of the arrow, between two knives or shears, Z, the desired distance. The upper knife, which moves with a scissor-like action, is pivoted at $Z^2$, and upheld or kept open by a spring, $Z^3$. After a sufficient length of paper to form the bag has passed between the knives, the upper knife is forced down or closed on the lower one by means of the pin $u$ striking the end of it, (operated by the lever U and connecting-rod $t$,) and thus separating a piece of paper, after which the knife returns to its normal position. The separated piece of paper falls onto a mold-plate. This mold-plate is provided as a pattern or form over which to fold the paper. This plate (shown in these figures by dotted lines $A^2 A^3 A^2$) consists of two metal plates of peculiar form, $A^2 A^2$ and $A^3$, which are both movable, the object and use of which will be understood by the following description of the operations.

The separated sheet of paper B, which has fallen upon the mold-plate, is now in a position for the folding operations to commence, which is illustrated by Figs. 21, 22, and 23, Fig. 21 being a front elevation, partly in section; Fig. 22, a sectional plan, showing the strikers, gage-plate, &c.; and Fig. 23, a perspective view of this part of the apparatus. The gage-plate A' descends and holds the paper upon the mold-plate. At the same time the strikers C', to which the mold-plate is connected, also descend, the lower edges of the strikers C' striking simultaneously both sides of the paper, as shown in the diagrams sides of the paper, as shown in the diagrams 21, 22, and 23, pressing them downward over the mold-plate, as seen best in the perspective views, Figs. 21 and 23. These depressed sides of the paper are now to be folded on the under side of the mold-plate $A^2 A^3 A^2$, so that one overlaps the other, in order that, as the edge of one of the sides has been previously pasted, the other, being folded over it, shall form a paper tube having the mold-plate inside. This part of the operation is illustrated in Figs. 24, 25, and 26, where Figs. 24 and 25 are sectional front elevations, showing the mechanism for folding the paper under the mold-plate $A^2 A^3 A^2$, and Fig. 26 a perspective view of this part of the apparatus.

Figure 29:
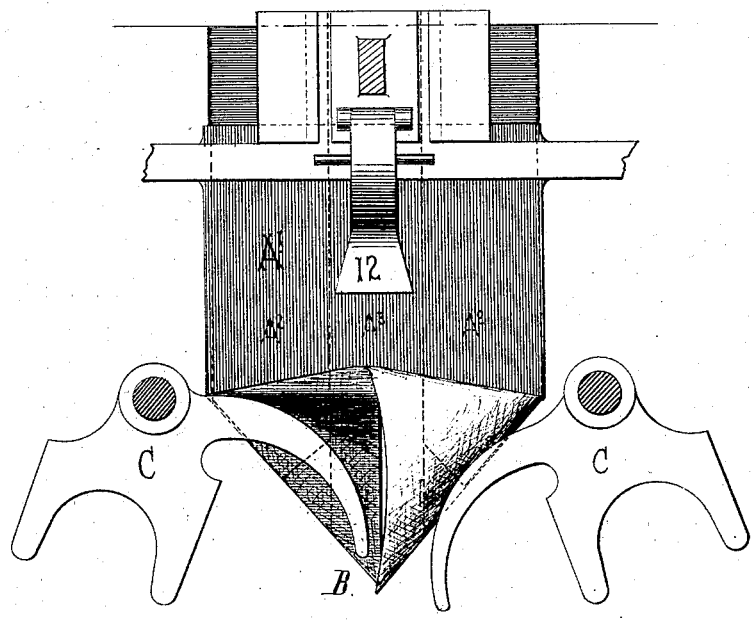

It will be seen that the right-hand folding side slide, H, is moved forward in advance of the other and presses that overhanging side of the paper up to the under side of the mold-plate. (See Fig. 24.) On the return of this side plate, which commences before the left-hand-side slide has completed its forward motion, the edge of the right-hand side of the paper is left adhering to the under side of the mold-plate, as shown at Fig. 25, and will be maintained in that position for an instant by the pressure of the air on its under side. The left-hand slide H will, on completing its motion, fold the left-hand side of the paper over or on the aforesaid momentarily-adhering edge of the other side, pressing the two together and forming the tube. The bottom of the bag is now to be formed, and this part of the bag manufacture is illustrated in Figs. 27 to 33, and is divisible into three successive operations, viz: first, the opening of the end of the tube to enable the bottom of the bag to be formed as shown at Figs. 27 and 28; secondly, the creasing over of the opened tube, as shown at Figs. 29 and 30; and, thirdly, the finishing folding over of the remaining corners, &c., as illustrated at Figs. 31, 32, and 33.

It will be seen on reference to Figs. 27 and 28, which show in plan and side views those parts of the mechanism which are now to be brought into action, that the paper tube is now held firmly by or between the depressed gage-plate A' and the mold-plate $A^2 A^3 A^2$ in a suitable position for the opening of the end of the tube. The finger A, which may conveniently be formed with a flattened end oval or heart-shaped in plan view, is carried on a swinging arm, 3, and has also a slight axial motion, so that it may, when brought into action, enter the end of the paper tube and pass between the paper and the upper side of the mold-plate as it advances into the end of this finger semi-rotation on its axis the position shown in Fig. A is brought into the position shown in Fig. 28, and in completing its advance motion will lift the upper portion of the paper tube into a nearly vertical position, which position is that required for the efficient action of the creasers C. Figs. 29 and 30 show in plan views the creasers C in two positions, Fig. 29 showing the creasers flattening down the sides of the opened tube, and Fig. 30 showing the creasers at the end of their action.

It will be seen from the above figures that the gage-plate A', besides holding down the paper firmly, as above mentioned, serves to determine the line at which the upper part of the tube is to be folded over onto it, and when so folded the corner of the fold overlies the end of the hinged finger 12. These creasers C act in succession upon the opened tube, as shown at Fig. 29, in order that the one side shall be folded under the other.

Figure 30:
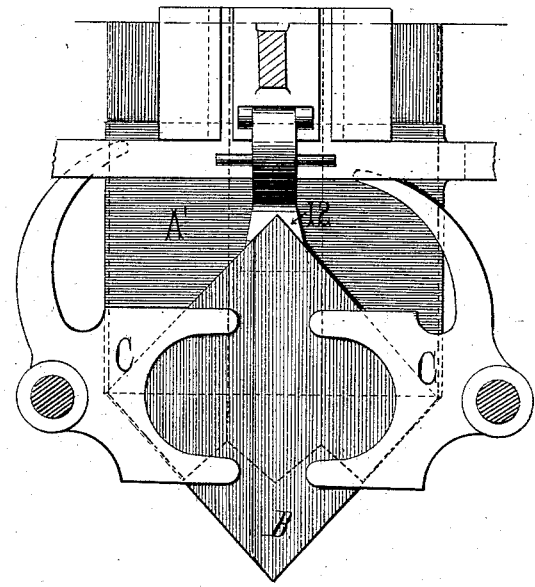
Figure 31:
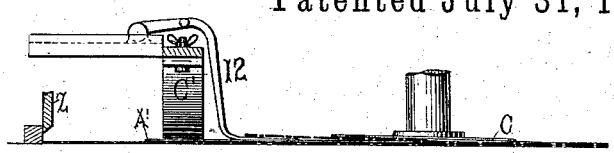
Figure 32:
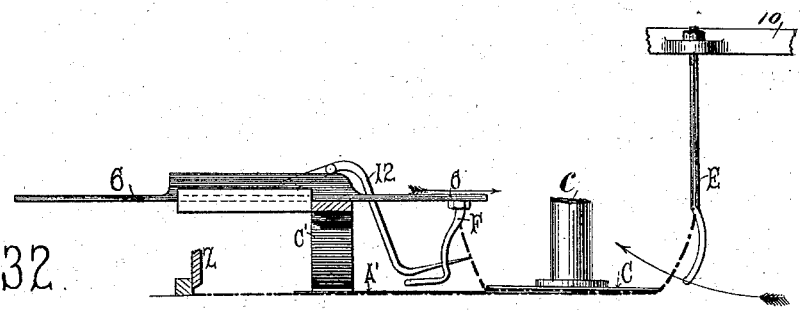
Figure 33:
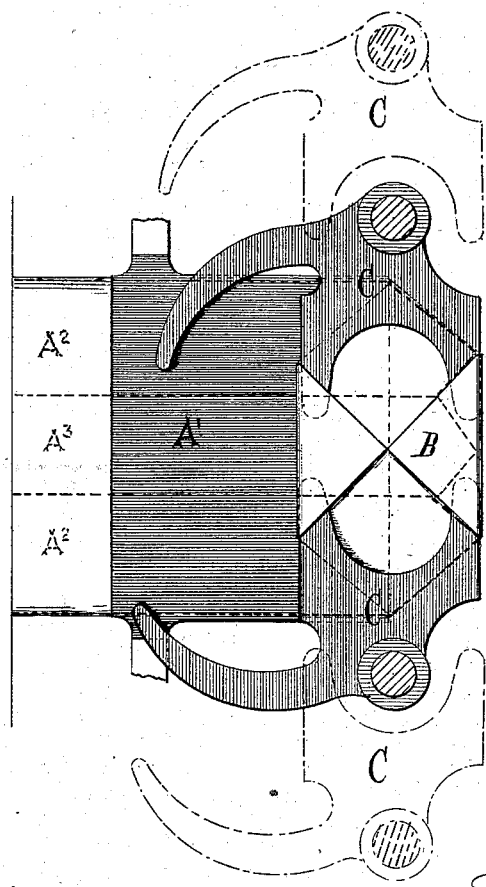

When the creasers C have arrived at the position Fig. 30, their parallel sides are in line and in a suitable position to form a gage for the completing folds, the mechanism for producing which is shown in elevation at Figs. 31 and 32. The central portion of the mold-plate $A^3$ is now to be moved back, as in Fig. 30, to allow of the front corner of the bag being folded over. The hinged finger 12 (under the flattened-down back corner of the bag, as shown at Figs. 30 and 31) is resting on the gage-plate. At this time the slide 6, Fig. 32, carrying the back bit or folding-foot F, is moved forward, and a cam on its upper surface strikes the pins projecting from both sides of the finger 12 and lifts the hinged finger, the bottom edge of which lifts up the back corner of the bag and allows the back bit, F, to pass under the back corner of the bag. As this folding-bit F advances it will carry the back corner of the bag over the parallel edges of the creasers C into the position shown at Fig. 33. Simultaneous with this action the front corner of the bag is folded over the other parallel edges of the creasers C by the front bit, E, which acts upon it in a similar manner, having a motion in the direction of the arrows in Fig. 32, by which the front corner will be lifted and carried over the creasers, as described, and shown in complete folded form at Fig. 33. The creasers C are then withdrawn laterally into the dotted position of Fig. 33, and the side tongues of the mold-plate $A^2$ $A^2$ are now moved forward, carrying with them (the tongues) the bag, in advance of the other or central part, $A^3$, of the mold-plate, and thus thrust the bag into the bite of a pair of delivery-rollers, which will withdraw it from off the mold-plate and deliver it from the machine into any suitable receptacle.

A drier for drying the pasted portions of the bag is not necessarily a part of the machine; but we prefer to use one to partially dry the bags as they pass over the surface of a box in which steam is brought by pipes, thereby remaining continually heated. The bag is drawn over it by cloths and rollers driven by pulley or gut-wheel in the ordinary manner.

Having now described and ascertained the nature of this our invention, we would have it understood that we do not bind ourselves to exact details shown in the drawings, but reserve the right to alter proportions and obtain the various results by motions as found most desirable; but

What we claim is—

1. The mold-plate having two moving parts, $A^2$ $A^3$, the center part, $A^3$, being made to be drawn back, in combination with the gage-plate A' and slide-finger A, side slides, H, and creasers C, substantially as described and shown.

2. The mold-plate having two moving parts, $A^2$ $A^3$, the center part, $A^3$, being made to be drawn back to allow the front corner of the bag to be turned over on each side to form the side angles of the bag, and the part $A^2$ being employed to thrust and carry forward the finished bag into the bite of the delivery-bands, substantially as described, and illustrated in the drawings.

3. The finger A, shaped, as specified, according to the thickness and quality of the paper, and mechanism, substantially as described, for turning the finger A to a right angle after having drawn up and opened the mouth of the tube-formed part of the bag, to allow the creasers C to operate substantially as described, and illustrated in the drawings.

4. The combination, with a roller for paper and the rollers R R', of the roller S, around which the paper passes, the lever $J^2$, link $P^2$, lever J, shaft J', cam O', and lever O, for actuating said roller S, and the rack P, and link P', connecting to the lever O, for actuating the rollers R R', substantially as set forth.

5. The combination, in a paper-bag machine, of the inking-roller K with the feeding-rollers R and the type-plates upon the same, slide-rack P, link P', lever O, and cam O', substantially as and for the purposes set forth.

6. The combination, with the rollers L' N', of the paste-box M', the roller N, rack-bar P, and mechanism, substantially as described, for actuating the same, and the belt 20 to the roller N', the paste-box M, paste-arm 19, lever 18, and cam 17, substantially as set forth.

7. The combination of the rollers N N', the inking-roller K, the feeding-rollers R and the type-plates upon the same, the rack, and mechanism for operating the feeding-rollers, substantially as set forth.

THOMAS COATES.
JOSEPH JAMES BISSICKS.

Witnesses to the signature of the said Joseph James Bissicks:
WILLIAM HERROL KNAPP,
Artd. Clerk to Walter James Nicholas, Solicitor,
13 Corn Street, Bristol, England.
JOHN WHYATT,
46 Victoria St., Bristol, Dry Salter's Assistant.

Witnesses to the signature of the said Thomas Coates:
CHAS. LAWNER,
9 Bank Street, Carlisle, Solicitor's Clerk.
JAS. RICHARDS,
33 Bank Street, Carlisle, Accountant.